(12) United States Patent
Ostertag et al.

(10) Patent No.: US 11,772,566 B2
(45) Date of Patent: Oct. 3, 2023

(54) VEHICLE SAFE

(71) Applicant: Dr. Ing. h.c. F. Porsche Aktiengesellschaft, Stuttgart (DE)

(72) Inventors: Jasmin Ostertag, Stuttgart (DE); Erwin Götz, Weil der Stadt (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 48 days.

(21) Appl. No.: 17/529,407

(22) Filed: Nov. 18, 2021

(65) Prior Publication Data
US 2022/0185194 A1 Jun. 16, 2022

(30) Foreign Application Priority Data
Dec. 15, 2020 (DE) .................. 10 2020 133 514.8

(51) Int. Cl.
*B60R 7/08* (2006.01)
*B60R 7/04* (2006.01)

(52) U.S. Cl.
CPC .............. *B60R 7/087* (2013.01); *B60R 7/04* (2013.01); *B60R 7/046* (2013.01)

(58) Field of Classification Search
CPC ......... B60R 7/046; B60R 7/00; B60R 7/087; B60R 7/12
USPC ..................................... 296/39.13
See application file for complete search history.

(56) References Cited

U.S. PATENT DOCUMENTS

| 2,798,445 | A | | 7/1957 | Gehman |
| 4,807,920 | A | * | 2/1989 | Fujiki ................. B60R 7/12 211/63 |
| 5,048,887 | A | | 9/1991 | Kunishima et al. |
| 5,066,079 | A | * | 11/1991 | Lawrence ............. E05G 1/00 109/54 |
| 6,530,618 | B2 | | 3/2003 | Nozaki et al. |
| 7,819,465 | B2 | * | 10/2010 | Elliott ................. B62D 25/04 296/202 |
| 8,979,160 | B1 | | 3/2015 | Pericak et al. |
| 10,081,307 | B2 | * | 9/2018 | Secord .................. B60R 7/12 |
| 10,385,594 | B2 | * | 8/2019 | Magner ................ E05B 85/10 |
| 10,457,220 | B2 | | 10/2019 | Sanchez |
| 10,919,455 | B2 | * | 2/2021 | Flynn .................. E05F 15/40 |
| 11,021,109 | B2 | | 6/2021 | H N et al. |
| 2007/0241582 | A1 | * | 10/2007 | McKeever ............. B60R 7/12 296/37.12 |

FOREIGN PATENT DOCUMENTS

| DE | 4030171 A1 | 4/1991 | |
| DE | 9315911 U1 | 3/1994 | |
| DE | 10307180 A1 * | 9/2004 | .............. B60R 7/00 |
| DE | 60126717 T2 | 12/2007 | |
| DE | 102008063145 A1 * | 8/2009 | .............. B60R 7/04 |

(Continued)

*Primary Examiner* — Jason S Morrow
(74) *Attorney, Agent, or Firm* — RatnerPrestia

(57) ABSTRACT

A vehicle has a door frame and a vehicle door assigned to the door frame, which door frame has a security compartment for holding valuables. The security compartment has a security compartment opening in the door frame. The vehicle door is movable between a closed first state and an open second state, wherein the security compartment is covered by the vehicle door in the first state, and wherein the security compartment is accessible via the door frame in the second state.

18 Claims, 2 Drawing Sheets

(56) References Cited

FOREIGN PATENT DOCUMENTS

| | | | |
|---|---|---|---|
| DE | 102012020639 A1 * | 4/2014 | ............... B60R 7/04 |
| DE | 202014103855 U1 | 9/2014 | |
| DE | 102019115858 A1 | 5/2020 | |
| GB | 2189756 A * | 11/1987 | ............... B60R 7/00 |

* cited by examiner

VEHICLE SAFE

CROSS-REFERENCE TO RELATED APPLICATION

This application claims priority to German Patent Application No. 10 2020 133 514.8, filed Dec. 15, 2020, the content of such application being incorporated by reference herein in its entirety.

FIELD OF THE INVENTION

The invention relates to a vehicle having a security compartment.

BACKGROUND OF THE INVENTION

DE 10 2019 115 858 A1, which is incorporated by reference herein, discloses a vehicle having a storage compartment provided in the region of the vehicle floor in a concealed manner.

U.S. Pat. No. 10,457,220 B2, which is incorporated by reference herein, discloses a vehicle having a storage space protected against theft, which is provided in the floor region of the vehicle.

DE 93 15 911 U1, which is incorporated by reference herein, discloses a valuables container for recreational vehicles and transport vehicles, which container is secured to the vehicle frame by means of screws.

U.S. Pat. No. 2,798,445 A, which is incorporated by reference herein, discloses a vehicle door with a safe incorporated into the vehicle door.

SUMMARY OF THE INVENTION

A vehicle has a door frame and a vehicle door assigned to the door frame, which door frame has a security compartment for holding valuables, which security compartment has a security compartment opening in the door frame, which vehicle door is movable between a closed first state and an open second state, wherein the security compartment is covered by the vehicle door in the first state, and wherein the security compartment is accessible via the door frame in the second state.

The security compartment opening is thus positioned on the door frame such that, with the vehicle door closed, it is at least partially covered by the latter, thereby allowing protection from theft. Not only is the security compartment not visible with the vehicle door closed, but also the vehicle door, as a normally strong structure, affords effective protection.

According to a preferred embodiment, the vehicle is in the form of a cabriolet. The vehicle thus does not have a roof, or it has an openable roof. In such vehicles without a roof or with an opened roof, the interior is accessible from the outside and there is a risk of theft.

According to a preferred embodiment, the vehicle has a bodyshell structure, the door frame is formed at least partially by the bodyshell structure, and the security compartment is connected to the bodyshell structure. The bodyshell structure affords effective protection from unauthorized access to the security compartment.

According to a preferred embodiment, the vehicle has a container, which container is designed to hold valuables and is accommodated in the security compartment opening. Such a container makes it easier to position the valuables.

According to a preferred embodiment, the container is accommodated in the security compartment so as to be removable via the security compartment opening. It is thus possible to remove the container accommodated in the security compartment and to fill it or empty it outside the security compartment.

According to a preferred embodiment, in the first state of the vehicle door, the security compartment opening is covered by the vehicle door at least to such an extent that the container is not removable from the security compartment. With the vehicle door closed, the container is thus not removable, and this increases security.

According to a preferred embodiment, between the vehicle door and the door frame, an outer seal and an inner seal are provided, which form a dry region between the outer seal and the inner seal in the region between the vehicle door and the door frame, and the security compartment opening is provided in the dry region. The dry region between the vehicle door and the door frame is, as a result, advantageously used in order to reduce or prevent water from penetrating into the security compartment in the closed state of the vehicle door.

According to a preferred embodiment, the security compartment opening is completely covered by the vehicle door in the first state of the vehicle door. This increases security. The vehicle door does not, in this case, have to be in contact with the edge of the security compartment opening, but it must cover the region outside the security compartment opening.

According to a preferred embodiment, a cover is provided on the security compartment opening, which cover is designed to at least partially cover the security compartment opening in the closed cover state in order, in the second state of the vehicle door, to reduce or prevent penetration of water into the security compartment in the event of rain. In particular for water-sensitive documents, it is advantageous for the security compartment to remain as dry as possible.

According to a preferred embodiment, the cover is captively fastened to the door frame. This prevents the cover from accidentally falling out of the vehicle when the vehicle door is open, and therefore no longer being able to close the security compartment opening.

According to a preferred embodiment, the cover is fastened to the door frame via a hinge. The hinge allows the cover to be swung open and closed and also results in captive fastening.

According to a preferred embodiment, the cover extends from the hinge toward the inside of the vehicle. As a result, the cover can be closed automatically when the vehicle door is closed.

According to a preferred embodiment, the cover is in the form of a sliding cover. Even when it is in an open state, such a sliding cover does not disrupt closing of the vehicle door.

According to a preferred embodiment, the cover is in the form of a shutter. A shutter requires little additional space in the open state.

According to a preferred embodiment, the vehicle door has a lock, which lock is configured, in the locked state, to prevent the vehicle door from moving from the first state into the second state, and the lock is the only security mechanism that prevents undesired access to the security compartment. The security function caused by closing the vehicle door is so good that no further protective measures such as locks are required on the cover. The cover can be opened readily without a key with the vehicle door open.

According to a preferred embodiment, the security compartment opening is provided at a point of the door frame which is assigned to the rear side of the vehicle door. This point is particularly suitable since, with the door open, it is readily accessible and there is frequently a particularly large amount of space for the security compartment in the region of the frame that is assigned to the rear side of the vehicle door.

According to a preferred embodiment, the security compartment opening is provided at a point of the door frame which is assigned to the front side of the vehicle door. As a result of the hinge mechanism at the front side of the vehicle door, this region affords particularly good protection.

According to a preferred embodiment, the vehicle door has a viewing area, which viewing area is able to be closed by a window, and the security compartment opening is provided at a point of the door frame, which point is provided, in terms of height, lower down than the viewing area. As a result, there is more scope for designing the vehicle at the height of the viewing area.

According to a preferred embodiment, the security compartment extends horizontally or at least with a horizontal component from the security compartment opening into the security compartment. This allows the security compartment to extend from front to rear, and there is better protection from water ingress compared with a downward extension.

According to a preferred embodiment, the maximum height of the security compartment is at least 10 cm, preferably at least 20 cm and particularly preferably at least 21 cm. This allows even relatively large objects to be protected, and a height of 21 cm corresponds to the width of a piece of paper in the DIN-A4 format.

According to a preferred embodiment, the maximum depth from the security compartment opening into the security compartment is at least 10 cm, preferably at least 20 cm and particularly preferably at least 30 cm. This allows even relatively large objects to be protected, and a depth of 30 cm corresponds to the height of a piece of paper in the DIN-A4 format.

The dimensioning of the security compartment has to concord with the bodyshell requirements. If the space requirement is considered early, however, appropriate adaptation of the bodyshell is possible.

According to a preferred embodiment, the vehicle has in each case only one vehicle door on the left-hand side and on the right-hand side. Such vehicles are referred to as coupes in a version with a roof and as cabriolets in a variant without a roof, there also being four-door cabriolets. In two-door vehicles, there is a particularly large amount of available space for the security compartment, and the latter can be designed in a large manner.

According to a preferred embodiment, the security compartment is provided in a side part of the vehicle. As a result, it is effectively protected.

According to a preferred embodiment, such a security compartment is provided on the left-hand side, on the right-hand side or on both sides of the vehicle.

According to a preferred embodiment, the vehicle has a self-supporting body. This affords a stable structure and thus a particularly high level of protection.

BRIEF DESCRIPTION OF THE DRAWINGS

Further details and advantageous developments of the invention will become apparent from the exemplary embodiments, which are described in the following text and illustrated in the drawings and should not be understood as limiting the invention in any way, and from the dependent claims. It goes without saying that the features mentioned above and those that will be explained below are usable not only in the combination indicated in each case but also in other combinations or on their own without departing from the scope of the present invention. In the drawings:

DETAILED DESCRIPTION OF THE INVENTION

In the following text, identical or equivalent parts are provided with the same reference signs and are usually described only once. The description builds on itself across the figures in order to avoid unnecessary repetitions.

Where relative terms such as left, right, top, bottom, front, rear are used in the description, these relate to the usual vehicle coordinate system unless stated to the contrary.

Figure 1:
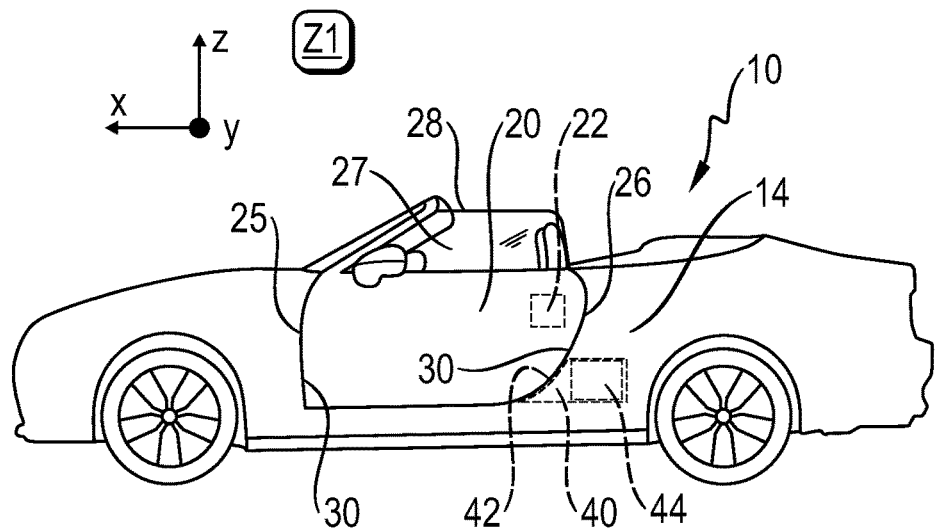
FIG. 1 shows a side view of a vehicle, illustrating the positioning of a security compartment provided in the door frame.

FIG. 1 shows a vehicle 10 having a door frame 30 and a vehicle door 20 assigned to the door frame 30. The vehicle door 20 is in a closed first state Z1 and can be moved into an open second state Z2—not illustrated. The vehicle door 20 has a lock 22, which is designed, in a locked state of the lock, to prevent the vehicle door 20 from moving from the first state Z1 into the second state Z2. The vehicle door 20 has a front side 25 and a rear side 26, wherein the usual vehicle coordinate system is indicated, in which the x-axis points to the front, the z-axis points to the top and the y-axis points to the right. The vehicle door 20 has a viewing area 27, through which the driver can see out to the side. The viewing area 27 is closable by a window 28.

The position of a security compartment 40 provided in a side part 14 of the vehicle 10 is schematically indicated, which security compartment 40 is arranged behind the outer panel and is accessible via the door frame 30. Schematically indicated in the security compartment 40 is a container 44 for valuables.

The vehicle 10 is an open vehicle, meaning that it has no roof or has an openable roof. Such vehicles are generally known as cabriolets, and they exist for example with two seats or with four seats, without a roof, with a removable roof or with a folding roof. Other designations for special vehicle types are roadster, speedster and targa (with a safety bar). In general, these can be referred to as open vehicles, i.e. vehicles without a fixed roof.

Figure 2:
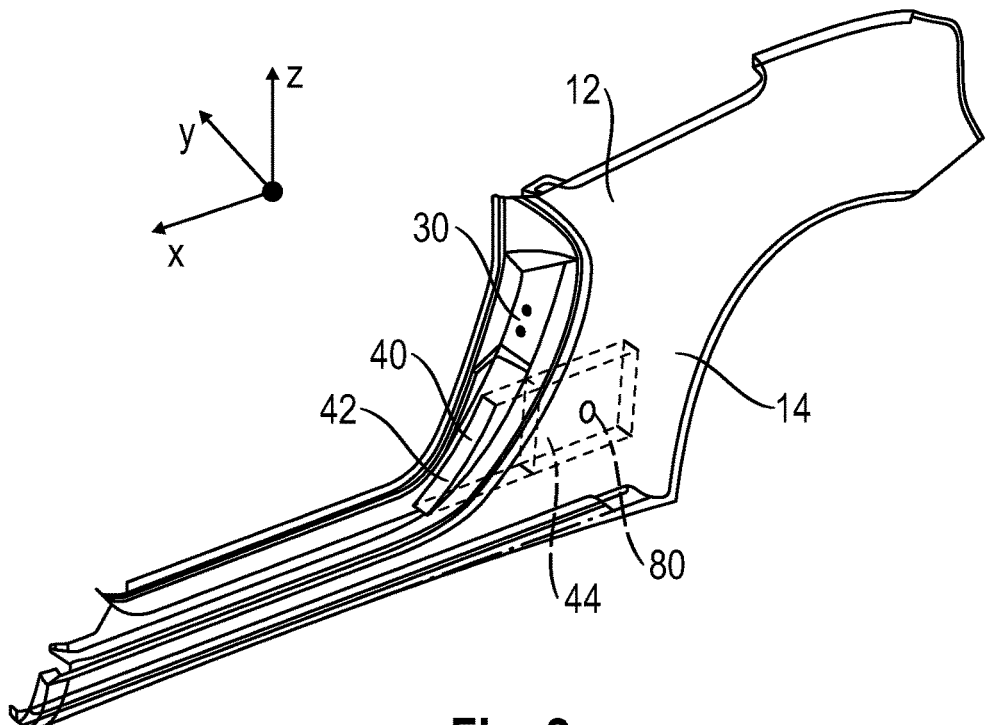
FIG. 2 shows a three-dimensional illustration of a vehicle part with a region of the door frame and with the security compartment.

FIG. 2 shows the side part 14, which also forms the door frame 30. The side part 14 is in the form of a bodyshell structure. In the exemplary embodiment, it is assembled from joined-together sheet-metal parts and can dissipate loads. The security compartment 40 has a security compartment opening 42 and, in the open second state Z2 of the vehicle door 20, valuable objects 80 can be placed in the security compartment 40 via the security compartment opening 42 and stored there. In the exemplary embodiment, a container 44 is accommodated in the security compartment 40, which container 44 is designed to hold valuable objects 80. In one embodiment, the container 44 can be partially pulled out of the security compartment 40 in order to deposit valuable objects 80 therein. In another embodiment, the container 44 can be provided in the security compartment 40 so as to be removable and can be pulled out of the security compartment 40 entirely in order to place valuable objects 80 therein.

In the exemplary embodiment, the security compartment 40 extends horizontally or at least with a horizontal component from the security compartment opening 42 into the security compartment 40. This allows a preferred arrangement of the security compartment at a point of the door frame 30 that is assigned to the front side 25 or the rear side 26. In the exemplary embodiment, the security compartment 40 is provided at a point assigned to the rear side 26 of the vehicle door 20. The security compartment opening 42 is provided preferably at a point of the door frame 30, which point is provided, in terms of height, lower down than the viewing area 27, cf. FIG. 1. This makes it easier to configure the vehicle 10 as a cabriolet without a B pillar or with a narrow A pillar or B pillar.

The security compartment 40 can be provided only on one side (left, right) of the vehicle 10 or on both sides. In vehicles 10 with two doors on the left-hand side and two doors on the right-hand side, an arrangement of the security compartment 40 both at the front door and at the rear door is possible in principle. Preferably, however, such a security compartment 40 is provided in vehicles 10 which have in each case only one vehicle door 20 on the left-hand side and on the right-hand side, since in such vehicles 10 there is usually more space available for the security compartment 40. Preferably, the vehicle 10 is designed with a self-supporting body, and this allows better protection of the security compartment 40 by the stronger structure.

The security compartment 40 can be mounted on the bodyshell structure and fixed for example during production, for example by being screwed or welded in place.

Preferably, additional reinforcement of the vehicle 10 can be brought about by the security compartment 40, in order for example to reinforce the body structure in the event of a rear impact. The security compartment 40 can thus be included as an element of the crash structure of the vehicle 10.

Figure 3:
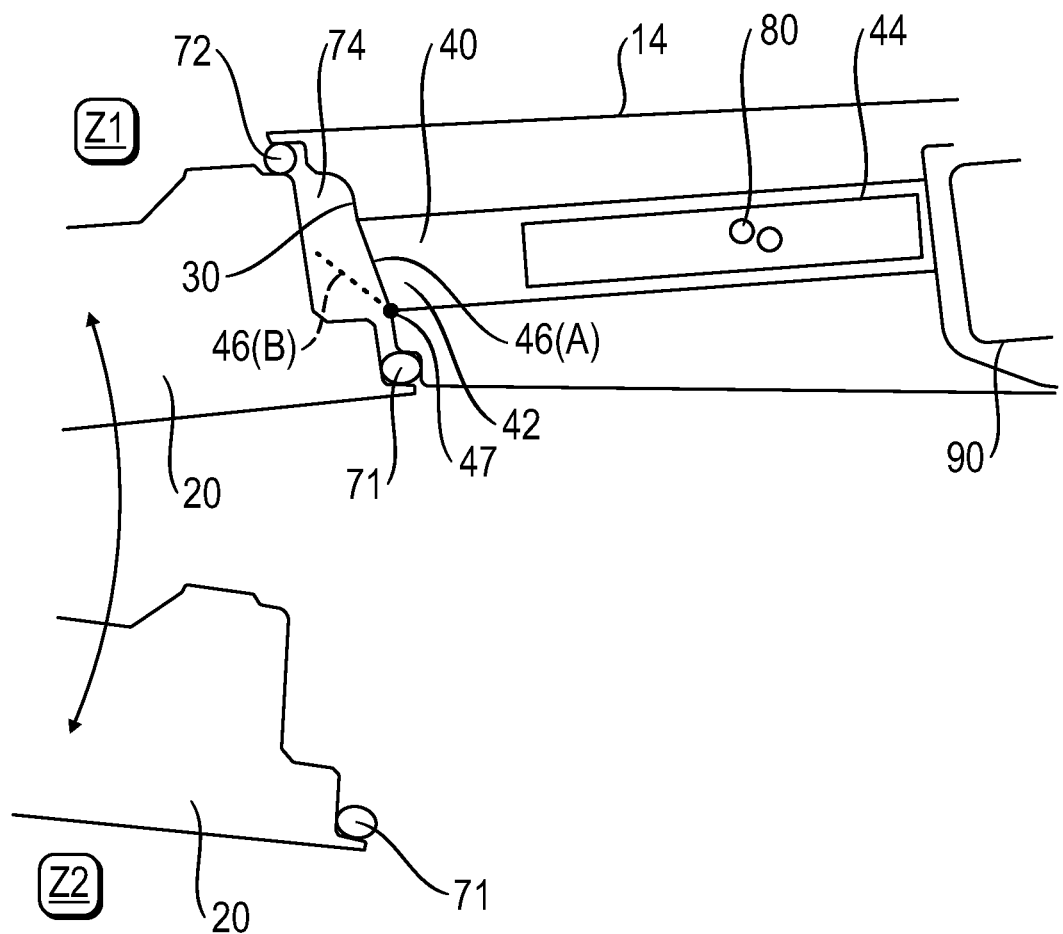
FIG. 3 shows a sectional schematic plan view of the door frame and a vehicle door in a closed first state and an open second state.

FIG. 3 shows, in a cross section, a schematic plan view of the vehicle door 20, the side part 14 with the door frame 30, and a wheel 90.

The vehicle door 20 is illustrated both in a closed first state Z1 and in an open second state Z2. In the open second state Z2, the security compartment opening 42 is accessible, and valuable objects 80 can be placed in the security compartment 40. When the vehicle door 20 is in the first state Z1, however, it covers the security compartment 40 at least partially, and the security compartment 40 is protected against theft by the vehicle door 20 as a result. In principle, it is sufficient for the vehicle door 20 to only partially cover the security compartment 40 in the first state Z1. When the container 44 is provided, it is sufficient for the security compartment opening 42, in the first state Z1, to be covered at least to such an extent by the vehicle door 20 that the container 44 cannot be removed from the security compartment 40. Preferably, however, the vehicle door 20 completely covers the security compartment opening 42 in the first state Z1, as is illustrated.

In the exemplary embodiment, an outer seal 71 and an inner seal 72 are provided between the vehicle door 20 and the door frame 30, and these two seals 71, 72 form what is known as a dry region 74 between the outer seal 71 and the inner seal 72 in the region between the vehicle door 20 and the door frame 30. The security compartment opening 42 is preferably provided in the dry region 74. As a result, the security compartment 40 is protected from moisture in the closed first state Z1 of the vehicle door 20.

In the exemplary embodiment, the first seal 71 is fastened to the vehicle door 20 and the second seal 72 is fastened to the door frame 30. This can also be the other way around, however, or combined on both parts.

At the security compartment opening 42, a cover 46 is preferably provided, which cover 46 is designed to at least partially cover the security compartment opening 42 in the closed cover state 46(A) and to allow access to the security compartment 40 in the open cover state 46(B). In the closed cover state 46(A), with the vehicle door 20 open and in the event of rain, penetration of water into the security compartment 40 can be reduced or prevented. In the exemplary embodiment, the cover 46 is fastened to the door frame 30 via a hinge 47, in order to prevent the cover 46 from falling off or being lost. Alternatively, the cover 46 can be configured for example as a sliding cover or as a shutter. Preferably, the cover 46 is captively fastened to the door frame 30, and this can be effected for example via the hinge 47 or via a plastics thread, as is also used in filler caps.

An advantage of the invention is that vehicle doors 20 are usually lockable, and in the locked first state Z1, the security compartment 40 is protected against theft. Thus, no further security mechanism is required in order to prevent undesired access to the security compartment 40.

Naturally, a wide variety of alterations and modifications are possible in the scope of the invention.

What is claimed is:

1. A vehicle comprising:
a body panel comprising a door frame and a wheel well positioned adjacent the door frame for accommodating a wheel of the vehicle;
a vehicle door assigned to the door frame;
a security compartment disposed in the door frame for holding valuables, which security compartment includes a security compartment opening in the door frame, wherein the security compartment extends from the security compartment opening in the door frame and terminates at a wall forming the wheel well; and
a cover on the security compartment opening, which cover is configured, in a closed cover state, to at least partially cover the security compartment opening in order, in the second state (Z2), to reduce or prevent penetration of water into the security compartment in the event of rain,
wherein the cover is fastened to the door frame via a hinge having a cover hinge axis, and wherein the cover is rotatable in a counterclockwise direction about the cover hinge axis from the closed cover state to an open cover state in which the security compartment opening is not concealed by the cover,
wherein the vehicle door is rotatable about a door hinge axis in a clockwise direction from a closed first state (Z1) to an open second state (Z2), and
wherein the security compartment is covered by the vehicle door in the first state (Z1), and wherein the security compartment is accessible via the door frame in the second state (Z2).

2. The vehicle as claimed in claim 1, further comprising a bodyshell structure, wherein the door frame is formed at least partially by the bodyshell structure, and wherein the security compartment is connected to the bodyshell structure.

3. The vehicle as claimed in claim 1, further comprising a container configured to hold valuables that is accommodated in the security compartment opening.

4. The vehicle as claimed in claim 3, wherein the container is accommodated in the security compartment so as to be removable via the security compartment opening.

5. The vehicle as claimed in claim 3, wherein, in the first state (Z1) of the vehicle door, the security compartment opening is covered by the vehicle door at least to such an extent that the container is not removable from the security compartment.

6. The vehicle as claimed in claim 1, further comprising an outer seal and an inner seal disposed between the vehicle door and the door frame, which seals form a dry region between the outer seal and the inner seal in the region between the vehicle door and the door frame, wherein the security compartment opening is disposed in the dry region.

7. The vehicle as claimed in claim 1, wherein the security compartment opening is completely covered by the vehicle door in the first state (Z1) of the vehicle door.

8. The vehicle as claimed in claim 1, wherein the vehicle door has a lock, which lock is configured, in the locked state, to prevent the vehicle door from moving from the first state (Z1) into the second state (Z2), and wherein, in said vehicle, the lock is the only security mechanism that prevents undesired access to the security compartment.

9. The vehicle as claimed in claim 1, wherein the security compartment opening is disposed at a point of the door frame which is assigned to a rear side of the vehicle door.

10. The vehicle as claimed in claim 1, wherein the vehicle door includes a viewing area, which viewing area is configured to be closed by a window, and wherein, in said vehicle, the security compartment opening is provided at a point of the door frame, which point is provided, in terms of height, lower than the viewing area.

11. The vehicle as claimed in claim 1, wherein the security compartment extends horizontally or at least with a horizontal component from the security compartment opening into the security compartment.

12. The vehicle as claimed in claim 1, wherein a maximum height of the security compartment is at least 10 cm.

13. The vehicle as claimed in claim 1, wherein a maximum depth from the security compartment opening into the security compartment is at least 10 cm.

14. The vehicle as claimed in claim 1, wherein the vehicle is a cabriolet having an openable roof.

15. The vehicle as claimed in claim 6, wherein a recess is formed on the door at a location between the outer seal and inner seal, wherein the recess is sized to accommodate pivoting of the cover toward the open cover position while the vehicle door is maintained in the first state.

16. The vehicle as claimed in claim 1, wherein the security compartment disposed in the door frame is aligned with a lower edge of the vehicle door.

17. The vehicle as claimed in claim 1, wherein the security compartment opening in the door frame is curved and follows a curvature of the door frame.

18. The vehicle as claimed in claim 1, wherein the security compartment disposed in the door frame is positioned at an elevation beneath a door lock of the vehicle.

* * * * *